United States Patent [19]

Swanson

[11] Patent Number: 4,923,240
[45] Date of Patent: May 8, 1990

[54] APPARATUS FOR RELEASABLY SECURING A COVER TO A STRUCTURE

[76] Inventor: Thomas E. Swanson, 4467 Clay St., Boulder, Colo. 80301

[21] Appl. No.: 255,438

[22] Filed: Oct. 11, 1988

[51] Int. Cl.$^5$ ............................................. B60J 7/10
[52] U.S. Cl. .................................... 296/100; 160/378
[58] Field of Search ................... 296/100, 98; 160/378

[56] References Cited

U.S. PATENT DOCUMENTS

| | | | |
|---|---|---|---|
| 4,409,749 | 10/1983 | Hamu | 160/378 |
| 4,639,033 | 12/1985 | Wheatley | 296/100 |
| 4,757,854 | 7/1988 | Rippberger | 160/378 |
| 4,792,178 | 12/1988 | Kokx | 296/100 |

*Primary Examiner*—Robert R. Song
*Attorney, Agent, or Firm*—Harold A. Burdick

[57] ABSTRACT

An apparatus for securely covering a material receiving structure, for example the cargo box of a pickup truck, is disclosed which includes a flexible cover, a cover positioning portion attachable to the structure adjacent to an open side thereof, and an engaging portion attached to the cover and selectively engagable with the cover positioning portion to thereby secure the cover over the open side. The cover positioning portion includes a body attachable to the structure, a wall extending from the body at a position spaced from the structure and a lip extending from the body at a position between the wall and the structure. The engaging portion includes a retainer and a bridging section, the retainer being positionable between the lip and wall of the cover positioning portion so that the bridging section contacts the wall when the cover is made taut over the open end of the structure thus causing the retainer to contact the lip. An elastic cord is connected with the engaging portion adjacent to the retainer thereof to bias the retainer toward the body of the positioning portion to supplement securement of the cover at the open end of the structure, and bows may be provided to bridge the open side to thus prevent sagging of the secured cover into the open side of the structure due to moisture accumulation and the like.

18 Claims, 3 Drawing Sheets

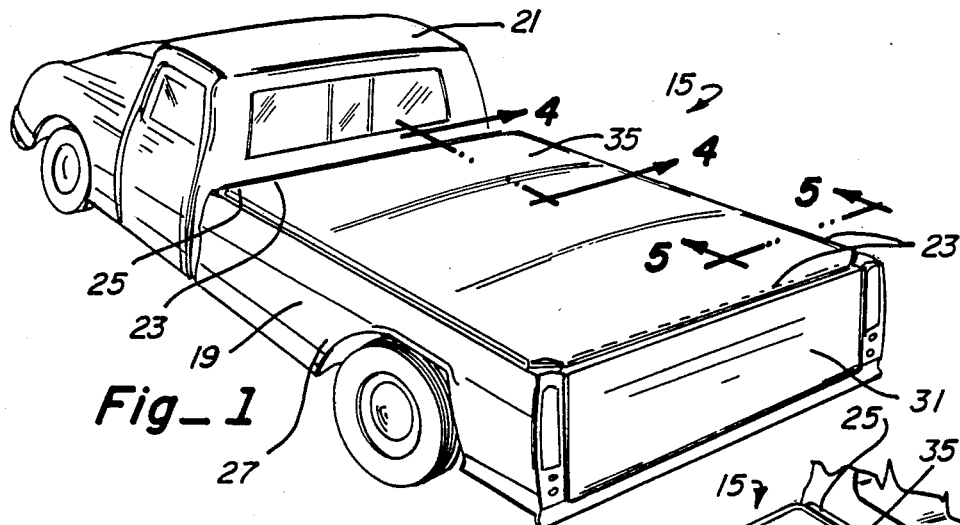
Fig_1
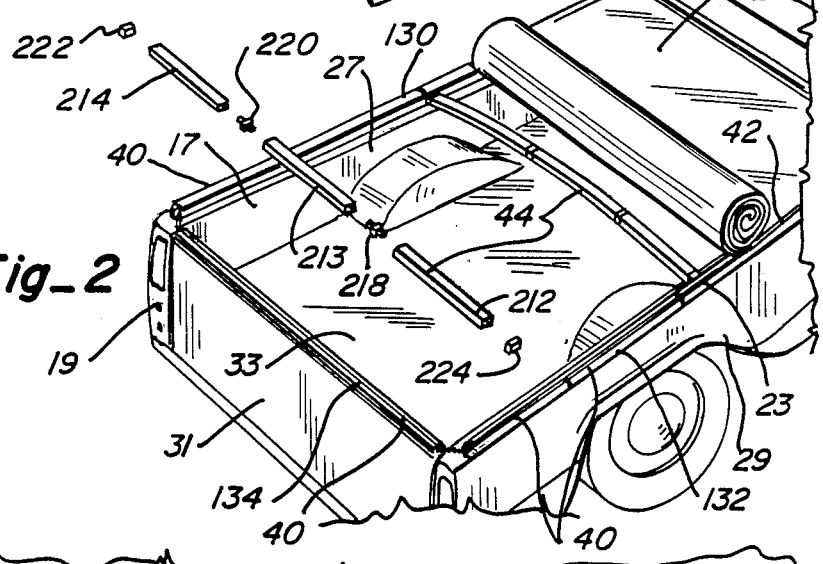
Fig_2
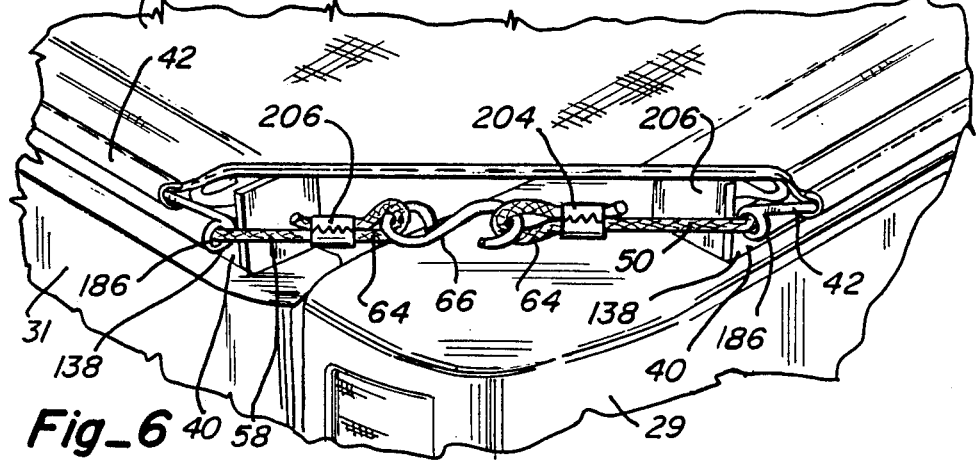
Fig_6

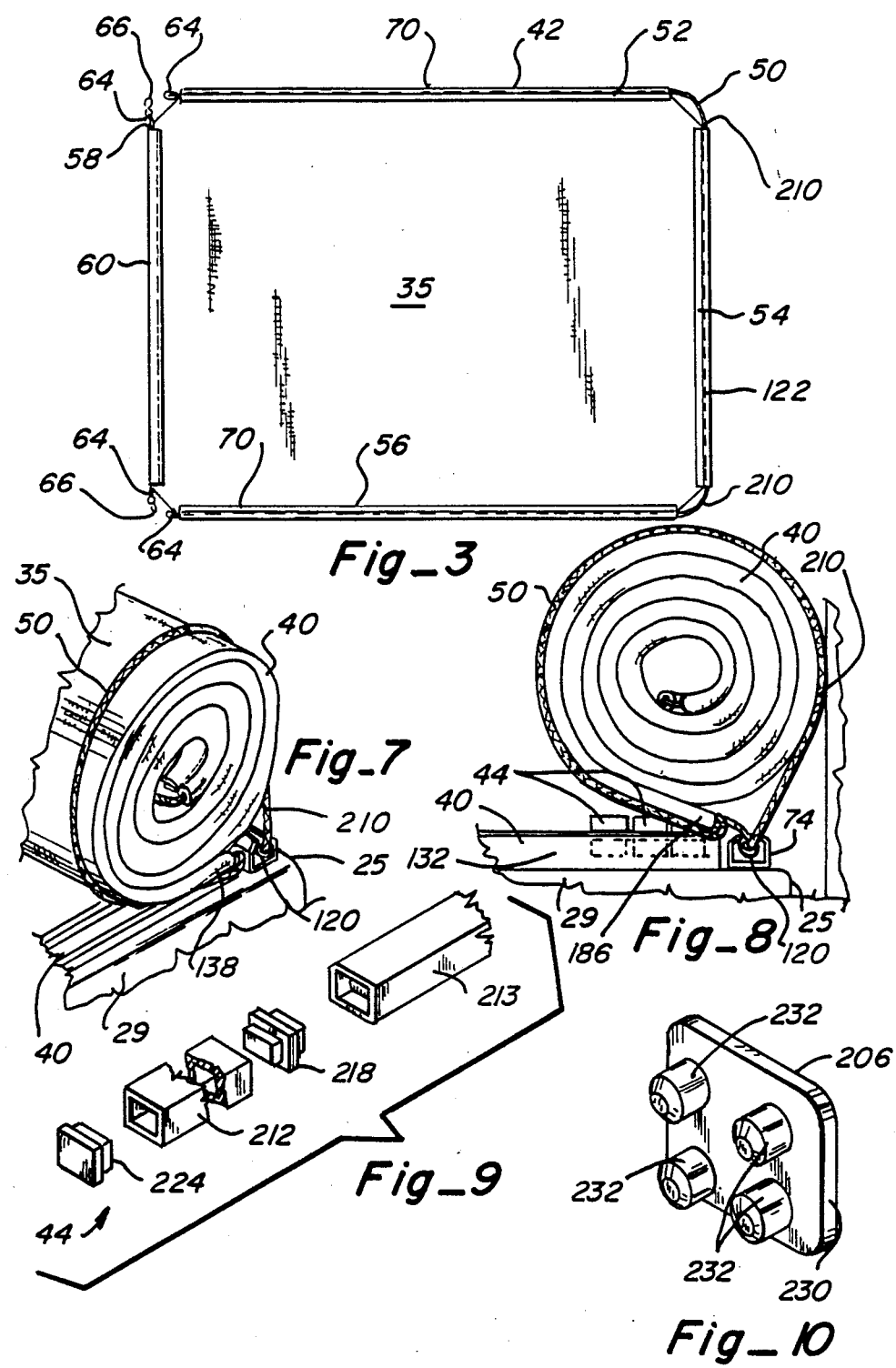

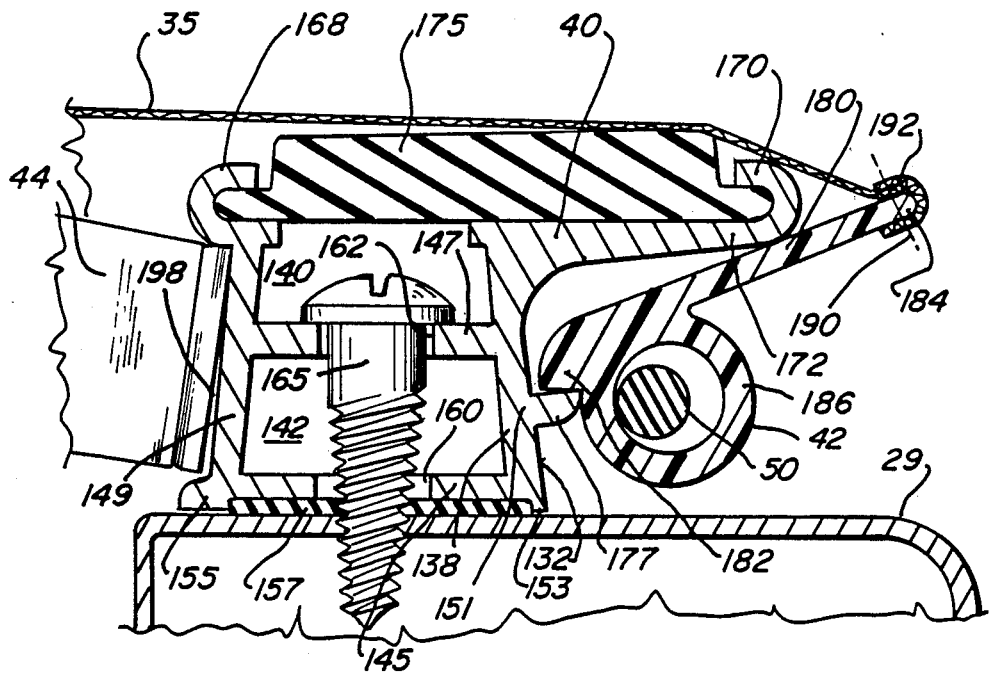
Fig_5
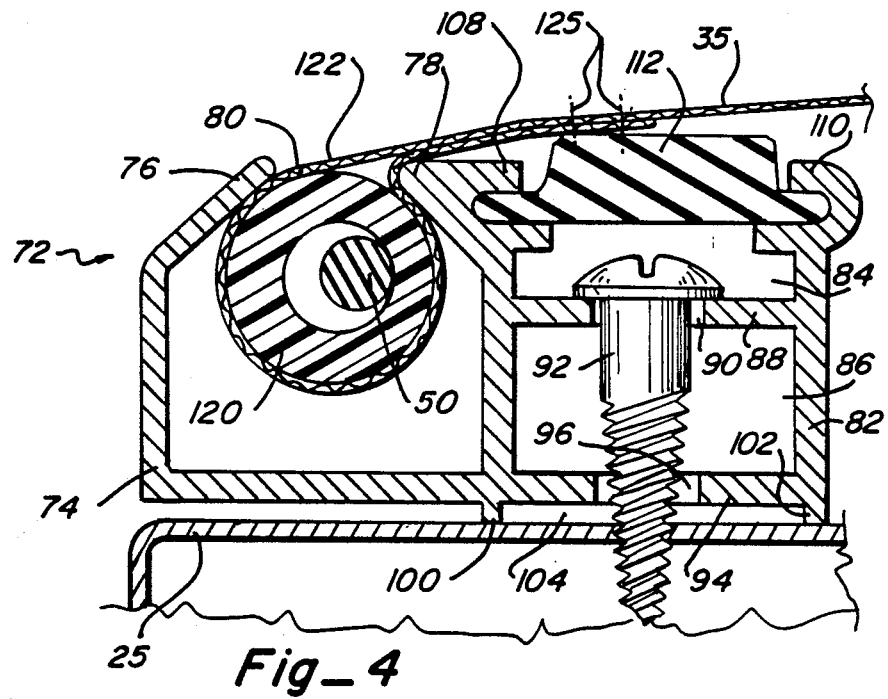
Fig_4

APPARATUS FOR RELEASABLY SECURING A COVER TO A STRUCTURE

FIELD OF THE INVENTION

This invention relates to protective covers, and, more particularly, relates to an apparatus for securely covering the open side of a material receiving structure.

BACKGROUND OF THE INVENTION

Protective and/or decorative cover systems, including a flexible cover and apparatus for releasable securement of such covers to a structure, are well known, and have been used, for example, for covering an opening in a material receiving structure, such as the cargo area of pickup trucks (where such covers are generally known as tonneau covers), boats and the like (see, for example, U.S. Pat. No. 4,639,033). Such apparatus heretofore known and/or utilized for securement of such covers have included utilization of snaps, tie downs, Velcro material, and matable channel and rail arrangements for securing the cover to the structure to be covered.

Covering systems heretofore known and/or utilized have not been completely successful, however, in providing such a securement apparatus which is durable, which evenly spreads stresses exerted on the cover when secured, allows the cover to be easily and quickly taken on and off the structure, allows for convenient storage of the cover and access to the structure without entirely removing the cover from the structure, provides for stability in wind where mounted on movable structures, prevents sagging of the cover when secured, is fittable to a multiplicity of differently sized structures, which is attractive with the cover off and provides protection against damage to the portion of the structure to which the apparatus is attached. Further improvements in such covering systems could therefore still be utilized.

SUMMARY OF THE INVENTION

This invention provides an apparatus for securing selected sections of a flexible article, such as a cover, to a structure, for example the cargo box of a truck, wherein an engaging portion attachable to the flexible article and having first and second parts releasably engages a positioning portion attachable to the structure so that the flexible article is tautly maintained between the sections thereof. The positioning portion includes a body with first and second mounting sections extending therefrom positioned so that the first and second parts of the engaging portion are positionable adjacent thereto and when thus positioned are urged substantially constantly in different directions into contact with the first and second mounting sections, respectively, the contacts maintaining the engaging portion in engagement with the positioning portion until actively disengaged by a user of the apparatus.

An elastic cord is connected to the engaging portion for releasably biasing the engaging portion toward the body of the positioning portion between the first and second mounting sections thereof to provide still more stable securement of the cover to tee structure. A resilient padding may be provided, positionable adjacent to the upper surface of the positioning portion, to provide protection against scratches, dents and the like to the positioning portion and to the area of the structure to which it is attached, for example the cargo box bed rail and/or tail gate of a truck. By thus constructing the apparatus, the apparatus fits a range of structures to be covered of different sizes.

It is therefore an object of this invention to provide an improved apparatus for releasably securing a flexible article to a structure.

It is another object of this invention to provide an apparatus for releasably securing a cover to a structure wherein an engaging portion having first and second parts is attachable to the cover and a positioning portion having first and second mounting sections is attachable to the structure so that the first and second parts of the engaging portion are positionable adjacent to the positioning portion and when thus positioned are urged substantially constantly in different directions into contact with the first and second mounting sections, respectively, thereof.

It is another object of this invention to provide an improved apparatus for releasably securing a cover to the bed rails and tailgate of a truck cargo box.

It is another object of this invention to provide an apparatus for covering the cargo box of a truck which includes a positioning portion attachable to the tailgate and side bed rails, a cover, an engaging portion attachable to the cover, and biasing means securable with the engaging portion for providing further securement of the cover over the cargo box.

It is another object of this invention to provide an apparatus for releasably securing a cover to a structure which includes bows for spanning an opening in the structure to be covered and, when thus positioned, to bow outwardly so that when the cover is secured thereover sagging thereof is prevented due to accumulation of moisture and the like.

It is another object of this invention to provide an apparatus for releasably securing a cover to a truck cargo box bed rails and tailgate including a positioning portion attachable to the bed rails and tailgate and an engaging portion attachable to the cover and releasably engagable with the positioning portion wherein the positioning portion includes a resilient protective padding secured to the upper surface of the positioning portion to provide protection against scratches, dents and the like to the bed rails and tailgate due to loading of cargo into, or carriage of cargo in, the cargo box.

With these and other objects in view, which will become apparent to one skilled in the art as the description proceeds, this invention resides in the novel construction, combination and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view showing the apparatus for releasably securing a cover to a structure of this invention mounted to a pickup truck cargo box bed rails and tailgate;

FIG. 2 is a partial perspective view of the apparatus of FIG. 1 and particularly illustrating the cover being disengaged from positioning and mounting rails of the apparatus attached to the bed rails and tailgate;

FIG. 3 is a bottom elevation view of the cover and engaging portion of the apparatus of FIG. 1 shown disengaged from the positioning and mounting rails;

FIG. 4 is a sectional view taken through section line 4—4 of FIG. 1 particularly illustrating the forward securement portion of the apparatus;

FIG. 5 is a sectional view taken through section line 5—5 of FIG. 1 particularly illustrating the releasable cover securing portions of the apparatus;

FIG. 6 is a partial perspective view of the apparatus of FIG. 1 particularly illustrating attachment of the elastic cord utilized to further assure securement of the cover;

FIG. 7 is a partial perspective view of the apparatus illustrating the cover in a stored position at the forward part of the pickup truck cargo box;

FIG. 8 is a side elevation view of the cover in its stored position as shown in FIG. 7;

FIG. 9 is a partial perspective view of the disassemblable bows utilized in the apparatus to bridge the opening in the cargo box and particularly illustrating the various parts utilized for assembly thereof; and FIG. 10 is a perspective view of a channel end cap of the apparatus utilized for capping the ends of the positioning and mounting rails.

DESCRIPTION OF THE INVENTION

Referring now to the drawings, an apparatus 15 for covering an opening in a structure, for example, the open side 17 of cargo box 19 of pickup truck 21, is shown in FIG. 1. Apparatus 15 includes apparatus 23 for releasably securing a cover to a structure.

As shown in FIGS. 1 and 2, cargo box 19 of truck 21 includes forward bed rail 25, side bed rails 27 and 29, releasable tailgate 31 and bed 33. Apparatus 15 includes cover 35 securable to the bed rails and tailgate by apparatus 23.

The apparatus 23 for releasably securing cover 35 to cargo box 19 includes a plurality of positioning and mounting portions 40- attachable to bed rails 27 and 29 and tailgate 31, engaging portion 42 attachable to cover 35, and bows 44 engagable between positioning and mounting portions 40 and spanning open side 17 of cargo box 19.

Cover 35 (generically known as a tonneau cover) is made of a flexible material, for example vinyl coated nylon or cotton, or a mixture thereof. Positioning and mounting portions 40 are typically unitarily constructed of aluminum, but could also be constructed of other appropriate materials such as durable plastics and the like. They may either be single channels of the length appropriate to run substantially the entire distance of the bed rail or tailgate upon which installed, or, as shown, comprise a plurality of shorter units (one to two feet in length) positioned end to end to thus cover the length of the bed rail or tailgate (for example, from near the truck cab to near the tailgate for side bed rail installation). Utilization of shorter units lends itself to ease of packaging.

Bows 44 may be constructed of wood, aluminum or plastic extrusion, and as shown in FIG. 2 may be constructed in several sections for easy disassembly and storage thereof and for packaging thereof for shipment. Engaging portion 42 should be constructed of a flexible plastic material extruded in strips of substantially equal length to the edge of the cover on which it is to be installed with the plastic material being relatively inflexible over short distances while maintaining some flexibility over longer distances to provide for durability and yet storability (as shown FIGS. 2, 7 and 8) of cover 35.

. FIG. 3 shows cover 35 and engaging portion 42 removed from truck 21 and illustrates the underside of cover 35. Engaging portion 42 has mounted therethrough (as more fully detailed hereinafter) an elastic cord 50 through lengths 52, 54 and 56 of engaging portion 42 and elastic cord 58 mounted through length 60 thereof. Cords 50 and 58 are provided for biasing engaging portion 42, and particularly lengths 52, 56 and 60 thereof, toward positioning and mounting portion 40 when cover 35 is installed over the open side of cargo bed 19 and matable loops 64 of the cords are connected utilizing hooks 66.

Cover 35 is attached to lengths 52, 56 and 60 of engaging portion 42 at the outer edges thereof by, for example, stitching 70.

Turning now to FIG. 4, a sectional view of forward cover mount assembly 72 of apparatus 23 attachable to forward bed rail 25 is shown. Assembly 72 includes channel 74 which is open at its opposite ends (adjacent to side bed rails 27 and 29) and which includes channel constricting flanges 76 and 78 on either side of an opening 80 at the upper portions thereof. Mounting channel 82 is provided having inner chambers 84 and 86 defined by wall 88 therein, with wall 88 having spaced openings 90 for passage therethrough of mounting screw 92. Bottom wall 94 includes openings 96 periodically spaced along bottom wall 94 for mounting screws 92 therethrough and into forward bed rail 25. Legs 100 and 102 are provided beneath channel 82 to provide space for mounting pad 104 therein.

Mounting pad 104 may be, for example, a neoprene strip having an adhesive side for ease of marking the position for installation of assembly 72 on forward bed rail 25 and for providing a padding beneath assembly 72 to provide protection against unduly marring bed rail 25.

While channel 74 is shown adjacent to the forward-most portion of forward bed rail 25, it should be understood that assembly 72 could be reversed so that channel 82 is positioned forwardmost to thereby facilitate utilization of apparatus 23 on structures, and with covers, of a variety of sizes.

Hook flanges 108 and 110 are provided on the upper side of channel 82 for permitting slidably mountable protective padding 112 therein after installation of screws 92. Protective padding 112 may be, for example, a resilient plastic material, and is provided for protection of assembly 72 and bed rail 25 against rusting, oxidation, scratching, denting and the like which might be caused by loading or carriage of material in cargo box 19 and hides abutting sections, where utilized, of channel 82 as well as screws 92.

Tubular mount 120 is provided within a loop 122 formed in cover 35 by, for example, stitching 125. Mount 120 may, for example, be constructed of a five-sixteenths of an inch O.D. polyethylene tubing, with the tubing being of greater diameter than the width of opening 80. When assembly 72 is mounted to forward bed rail 25 adjacent to the cab of truck 21, mount 120 is fitted through the loop 122, with the tubing and the loop then being slid into channel 74 through one of the open ends thereof, so that loop 122, and thus cover 35, extend through opening 80 and over flange 78. In this fashion, cover 35 is securable in channel 74. Before or after mount 120 is installed in channel 74, cord 50 is installed through mount 120.

FIG. 5 is illustrative of lengths 130, 132 and 134 of positioning portion 40 (as shown in FIG. 2), the lengths being substantially equal to the length of the bed rails or tailgate on which it is installed, it being understood that such lengths could be accomplished by end to end installation of a plurality of shorter units. Length 132 of positioning portion 40 is particularly illustrated in FIG. 5 attached to side bed rail 29, and includes central channel, or body, 138 having elongate compartments 140 and 142 defined therein by bottom wall 145, central wall 147, and side walls 149 and 151 thereof. Legs 153 and 155 extend below bottom wall 145 for mounting of padded strip 157 therebetween and between bed rail 29 and bottom wall 145.

Bottom wall 145 and central wall 147 have spaced openings 160 and 162 therein, respectively, for mounting of channel 138 to bed rail 29 utilizing screws 165. Hook flanges 168 and 170 are provided adjacent to the upper surface of channel 138, with flange 170 extending from the end of upper mounting wall 172 extending from channel 138. Hook flanges 168 and 170 receive protective pad 175 therein for purposes of protection of the bed rail and tailgate of the vehicle and concealing the fasteners and the like as heretofore described with regard to protective padding 112.

Mounting lip 177 extends from wall 151 of channel 138 below upper wall 172 thereof and above side rail 29.

Engaging portion 42, as shown in FIG. 5, includes bridging arm 180, which is relatively inflexible along the cross sectional length thereof, retaining, or abutting, end 182, outer attaching end 184, and tubular mount 186 having elastic cord 50 mounted therethrough. Cover 35 is attached to end 184 at one edge thereof by, for example, stitching 190 through cover 35, end 184 and through binding strip 192.

As may be appreciated, when cover 35 is made sufficiently taut, for example by securing the cover to forward bed rail 25 and proceeding to attach the cover to tailgate 31, so that when retaining end 182 is positioned adjacent to wall 151 between lip 177 and upper wall 172, the tautness of cover 35 urges bridging arm 180 in a substantially constant first direction toward wall 172, retaining end 182 being urged substantially constantly in a second direction towards lip 177 by the contact of bridge 180 with wall 172, thereby effectively maintaining engaging portion 42 in engagement with positioning portion 40.

The mounting position of engaging portions 42 may be varied along the width of the upper surface of bed rails 27 and 29 and tailgate 31 so that, together with the selected position of assembly 72, one cover size can be utilized to fit a plurality of differently sized truck beds.

Bow 44 is slidably maintained in channel, or track, 198 formed by wall 149, leg 155 and hook flange 168. With channels 198 of lengths 130 and 132 of positioning portion 40 being positioned on bed rails 27 and 29 facing one another (as shown in FIG. 2), bows 44, when assembled, may be slidably positioned between the channels and evenly spaced over the opening to thereby provide an outward bow from cargo box 19 so that when cover 35 is mounted thereover moisture accumulation and the like is prevented.

As shown in FIG. 6, where positioning portions 40 are attached to bed rails 29 and tailgate 31, elastic cords 50 and 58 extend through tubular mounts 186 of engaging portions 42 with matable loops 64 being maintained by crimps 204, and with the loops being connected by hook 66 to thereby bias mounting portions 42 toward channel 138 of positioning portion 40. Channels 138 have end caps 206 positioned therein to prevent moisture and dirt accumulation in the channel (cap 206 also being shown in FIG. 10).

When thus configured, the covering apparatus of this invention can be stored adjacent to forward bed rail 25 without removal of cover 35 from channel 74 as illustrated in FIGS. 7 and 8. Engaging portion 42 and cover 35 may be stored in a rolled configuration upon disengagement of lengths 52, 56 and 60 of engaging portion 42 from lengths 130, 132 and 134 of positioning portion 40. The rolled configuration is maintained by looping portions 210 of elastic cord 50 (shown also in FIG. 3) extending between tubular mounts 186 and 120 over the rolled cover as illustrated in FIGS. 7 and 8.

FIGS. 2 and 9 illustrate disassemblable bows 44 which include elongate sections 212, 213 and 214, connectors 218 and 220, and end caps 222 and 224. As illustrated in FIG. 8, when bows 44 are assembled and installed, the bows may be slid fully to the forward portion of lengths 130 and 132 of positioning portion 40 and adjacent to forward bed rail 25 to thereby provide a shelf upon which cover 35 and engaging portions 42 in their rolled configuration may be maintained when stored. When the cover is not in use, bows 44 may also be disassemblable for compact storage thereof either within the cargo bed of the vehicle or elsewhere.

FIG. 10 illustrates end caps 206 mountable in the ends of channels 138. Caps 206 include outer cap wall 230 and plugs 232, with the plugs being maintained in compartments 140 and 142 (as illustrated in FIG. 5) of channels 138 adjacent to the walls thereof.

As may be appreciated, an apparatus for securely covering a material receiving structure such as the cargo box of a pickup truck is provided which is durable, which evenly spreads stresses exerted on a cover when secured, which allows the cover to be easily and quickly taken on and off the structure, allows for convenient storage of the cover and access to the structure without entirely removing the cover from the structure, provides for stability in wind when mounted on movable structures, prevents sagging of the cover when secured and provides protection against damage to the portion of the structure to which the apparatus is attached.

What is claimed is:

1. A securing apparatus for securing a first section of a flexible cover to a structure, said flexible cover having at least a second section securable to said structure, said securing apparatus comprising:

positioning means for establishing a position of said first section of said flexible cover relative to said structure so that said flexible cover is tautly maintained between said first and second sections of said flexible cover when said sections are secured, said positioning means being attachable to said structure and including a body portion and first and second mounting portions;

engaging means engagable with said positioning means for securely maintaining said flexible cover on said structure, said engaging means being attachable to said first section of said flexible cover and including first and second parts positionable adjacent to said first and second mounting portions of said positioning means so that said first part is urged substantially constantly in a first direction into contact with said first mounting portion of said positioning means by said flexible cover when said second section thereof is secured to said structure, and said second part is urged substantially constantly in a second direction into contact with said second mounting portion of said positioning means by said contact of said first part with said first mounting portion of said positioning means, said contacts maintaining said engaging means in engagement with said positioning means and thus securing said first section of said flexible cover to said structure; and biasing means positioned adjacent to said second part of said engaging means for biasing said second part toward said body portion of said positioning means.

2. The securing apparatus of claim 1 wherein said structure includes at least a first truck cargo box bed rail, wherein said positioning means includes fasteners positionable through said body portion for attaching said positioning means to said bed rail, and wherein said body portion of said positioning means has upper and lower surfaces, said upper surface having said first mounting portion extending outwardly relative to said cargo box thereat, said lower surface being positioned adjacent to said first bed rail, and wherein said positioning means also includes resilient bed rail protecting means at said upper surface of said body portion and said first mounting portion for protecting said bed rail and concealing said fasteners.

3. The securing apparatus of claim 1 wherein said structure is a truck cargo box having a first bed rail, a second bed rail opposite said cargo box from said first bed rail, a forward bed rail and a tailgate opposite said cargo box from said forward bed rail, wherein said flexible cover has third and fourth sections, said second section being securable to said forward bed rail, wherein said positioning means is attachable to said tailgate and said first and second bed rails for establishing securing positions of said first, third and fourth sections of said flexible cover, respectively, and wherein said engaging means is attachable to said first, third and fourth sections of said flexible cover.

4. The securing apparatus of claim 3 wherein said apparatus further comprises channel means attached to said forward bed rail and a tubular mount securable to said second section of said flexible cover and slidably receivable in said channel means for securing said second section of said flexible article to said forward bed rail.

5. The securing apparatus of claim 4 wherein said engaging means includes a second tubular mount positioned adjacent to said second part thereof, and wherein said apparatus further comprises first and second biasing means each having matable engaging sections, said first biasing means being positioned through at least said tubular mount securable to said second section of said flexible cover, and said second biasing means being positioned through at least said second tubular mount of said engaging means adjacent to said tailgate of said structure, said matable engaging sections of said first and second biasing means being engaged with each other for biasing said second part of said engaging means toward said body portion of said positioning means.

6. A cover securing apparatus for releasably securing a flexible cover to a structure, said cover securing apparatus comprising:

cover positioning means for establishing the position of said cover relative to said structure when said cover is secured, said cover positioning means including a body portion attachable to said structure, a wall portion extending from said body at a position above said structure and a lip portion extending from said body portion below said wall portion;

engaging means engagable with said cover positioning means for maintaining said cover on said structure, said engaging means being attachable at one portion thereof to said flexible cover and having a retaining portion releasably positionable adjacent to said body portion of said cover positioning means between said wall portion and said lip portion thereof and a bridging portion extending between said one portion and said retaining portion, said bridging portion contacting said wall portion of said cover positioning means when said retaining portion is positioned adjacent to said body portion of said cover positioning means, and said retaining portion contacting said lip portion of said cover positioning means when said retaining portion is positioned adjacent to said body portion of said cover positioning means; and biasing means connected with said engaging means adjacent to said retaining portion thereof for biasing said retaining portion of said engaging means toward said body portion of said cover positioning means.

7. The cover securing apparatus of claim 6 wherein said structure is the forward bed rail, first and second opposite side bed rails and tailgate of a truck cargo box, wherein said flexible cover is a tonneau cover having leading, trailing, and first and second lateral edges, and wherein said apparatus further comprises channel means attached to said forward bed rail and a mount securable to said leading edge of said tonneau cover and slidably receivable in said channel means for securing said leading edge of said tonneau cover to said forward bed rail.

8. The cover securing apparatus of claim 7 wherein said positioning means and said channel means include resilient bed rail and tailgate protecting means for protecting upper surfaces of said bed rails and tailgate from marring due to cargo being loaded or carried in said cargo box.

9. The cover securing apparatus of claim 7 wherein said cover positioning means includes at least first, second and third independently mountable lengths thereof attached to said tailgate and said first and second opposite side bed rails, respectively, and wherein said engaging means includes first, second and third lengths thereof independently attachable to said trailing and first and second lateral edges of said tonneau cover, respectively, said lengths of said cover positioning means and said channel means being selectively positionable for attachment to said bed rails and tailgate so that a cover having a first size is fittable to a plurality of differently sized truck cargo boxes.

10. The cover securing apparatus of claim 9 wherein said second and third lengths of said cover positioning means each include track means extending from said body portion thereof facing inwardly toward each other, and wherein said apparatus further comprises a plurality of resilient bows having opposite end portions slidably receivable in a different one of said track means of said second and third lengths of said cover positioning means to thereby span said cargo box between said first and second opposite side bed rails thereof, said bows being of a length so that said bows are bowable away from said cargo box when received by said track means, said tonneau cover being secured over said bows.

11. The cover securing apparatus of claim 10 wherein said plurality of bows each include a plurality of sections, said sections of each of said bows being movable between storable and assembled positions relative to one another.

12. The cover securing apparatus of claim 10 wherein said engaging means is constructed of a material which is flexible at least in a first direction so that when said first, second and third lengths thereof are released from said cover positioning means said cover may be compactly stored adjacent to said forward bed rail of said cargo box.

13. The cover securing apparatus of claim 12 wherein said plurality of bows are slidable in said track means to positions adjacent to said forward bed rail of said cargo box to thereby cooperatively form a shelf thereat, wherein said cover is stored in a rolled configuration on said shelf without detaching said mount from said channel means, and wherein said biasing means includes sections for releasably maintaining said cover in its rolled configuration.

14. An apparatus for covering an open side of a cargo holding structure having at least a first side wall portion adjacent to said open side of said structure, said apparatus comprising:
a flexible cover;
cover positioning means for establishing the position of said cover relative to said at least first side wall portion of said structure, said cover positioning means including a body portion attachable to said at least first side wall portion of said structure, first and second mounting portions extending from said body portion and resilient protecting means securable adjacent to said body portion for protecting an upper surface of said side wall portion and said cover positioning means from marring during movement of said cargo; and
engaging means engagable with said cover positioning means for maintaining said cover adjacent to said open side of said structure, said engaging means being attached to said flexible cover and being substantially inflexible in a first direction and including first and second parts positionable adjacent to said first and second mounting portions, said first part being releasably positionable adjacent to said first mounting portion of said cover positioning means so that it can be urged into contact with said first mounting portion, and said second part being urged into contact with said second mounting portion of said cover positioning means when said first part is urged into contact with said first mounting portion of said cover positioning means, said contacts maintaining said engaging means in engagement with said cover positioning means and thus securing said flexible cover adjacent to said open side of said structure.

15. The apparatus of claim 14 wherein said structure has at least second and third side wall portions spaced from one another and adjacent to said open side, said cover positioning means including at least first, second and third lengths thereof independently attachable to said first, second and third side wall portions, respectively, and said engaging means having first, second and third lengths thereof attached to different parts of said flexible cover and being releasably engagable with said first, second and third lengths of said cover positioning means respectively.

16. The apparatus of claim 15 wherein said second and third lengths of said cover positioning means each include track means extending from said body portion thereof facing inwardly toward each other, and wherein said apparatus further comprises a plurality of resilient bows slidably positionable between said track means so that said bows span said open side of said structure and bow outwardly from said structure.

17. The apparatus of claim 15 wherein said structure includes at least a fourth side wall portion with said cover being securable thereto, wherein said engaging means is formed of a material which is flexible in a second direction so that when said first, second and third lengths of said engaging means are released from engagement with said lengths of said cover position means said cover is securably storable in a rolled configuration adjacent to said fourth side wall portion of said structure without disengagement of said cover from said fourth side wall portion or of said engaging means from said cover.

18. The apparatus of claim 14 wherein said engaging means includes a tubular mount adjacent to said second part thereof and wherein said apparatus further comprises biasing means positioned through said tubular mount for biasing said second part of said engaging means toward said body portion and said second mounting portion of said cover positioning means.

* * * * *